US011212770B2

(12) United States Patent
Ozturk et al.

(10) Patent No.: US 11,212,770 B2
(45) Date of Patent: Dec. 28, 2021

(54) TECHNIQUES FOR CONFIGURING PAGING CYCLES

(71) Applicant: QUALCOMM Incorporated, San Diego, CA (US)

(72) Inventors: Ozcan Ozturk, San Diego, CA (US); Gavin Bernard Horn, La Jolla, CA (US); Reza Shahidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/889,300

(22) Filed: Jun. 1, 2020

(65) Prior Publication Data

US 2020/0413371 A1    Dec. 31, 2020

Related U.S. Application Data

(60) Provisional application No. 62/867,528, filed on Jun. 27, 2019.

(51) Int. Cl.
*H04W 68/02* (2009.01)
*H04W 84/04* (2009.01)

(52) U.S. Cl.
CPC .......... *H04W 68/02* (2013.01); *H04W 84/045* (2013.01)

(58) Field of Classification Search
CPC ........................... H04W 68/02; H04W 84/045
USPC ................... 455/458, 414.1, 418, 466, 422.1
See application file for complete search history.

(56) References Cited

U.S. PATENT DOCUMENTS

| 8,626,206 | B2* | 1/2014 | Fang | H04W 68/025 455/458 |
| 9,344,996 | B2* | 5/2016 | Takano | H04W 68/005 |
| 2014/0146795 | A1* | 5/2014 | Tian | H04W 68/00 370/336 |
| 2014/0221023 | A1* | 8/2014 | Maggenti | H04L 65/1016 455/458 |

(Continued)

FOREIGN PATENT DOCUMENTS

| EP | 2677818 A1 | 12/2013 |
| WO | 2011056254 A1 | 5/2011 |
| WO | 2015180059 A1 | 12/2015 |

OTHER PUBLICATIONS

International Search Report and Written Opinion—PCT/US2020/035732—ISAEPO—dated Nov. 20, 2020.

(Continued)

*Primary Examiner* — Nghi H Ly
(74) *Attorney, Agent, or Firm* — Dalei Dong; Harrity & Harrity, LLP

(57) ABSTRACT

Various aspects of the present disclosure generally relate to wireless communication. In some aspects, a base station (BS) may determine a first type of paging cycle configuration. The BS may determine a second type of paging cycle configuration that is different from the first type of paging cycle configuration, wherein the second type of paging cycle configuration enables a plurality of different paging cycles. The BS may transmit to a user equipment, a paging cycle configuration message, wherein the paging cycle configuration message includes an indication of the second type of paging cycle configuration. Numerous other aspects are provided.

30 Claims, 13 Drawing Sheets

(56) References Cited

U.S. PATENT DOCUMENTS

2015/0365216 A1 12/2015 Chen et al.
2018/0368098 A1 12/2018 Gopal et al.

OTHER PUBLICATIONS

Partial International Search Report—PCT/US2020/035732—ISA/EPO—dated Sep. 29, 2020.

* cited by examiner

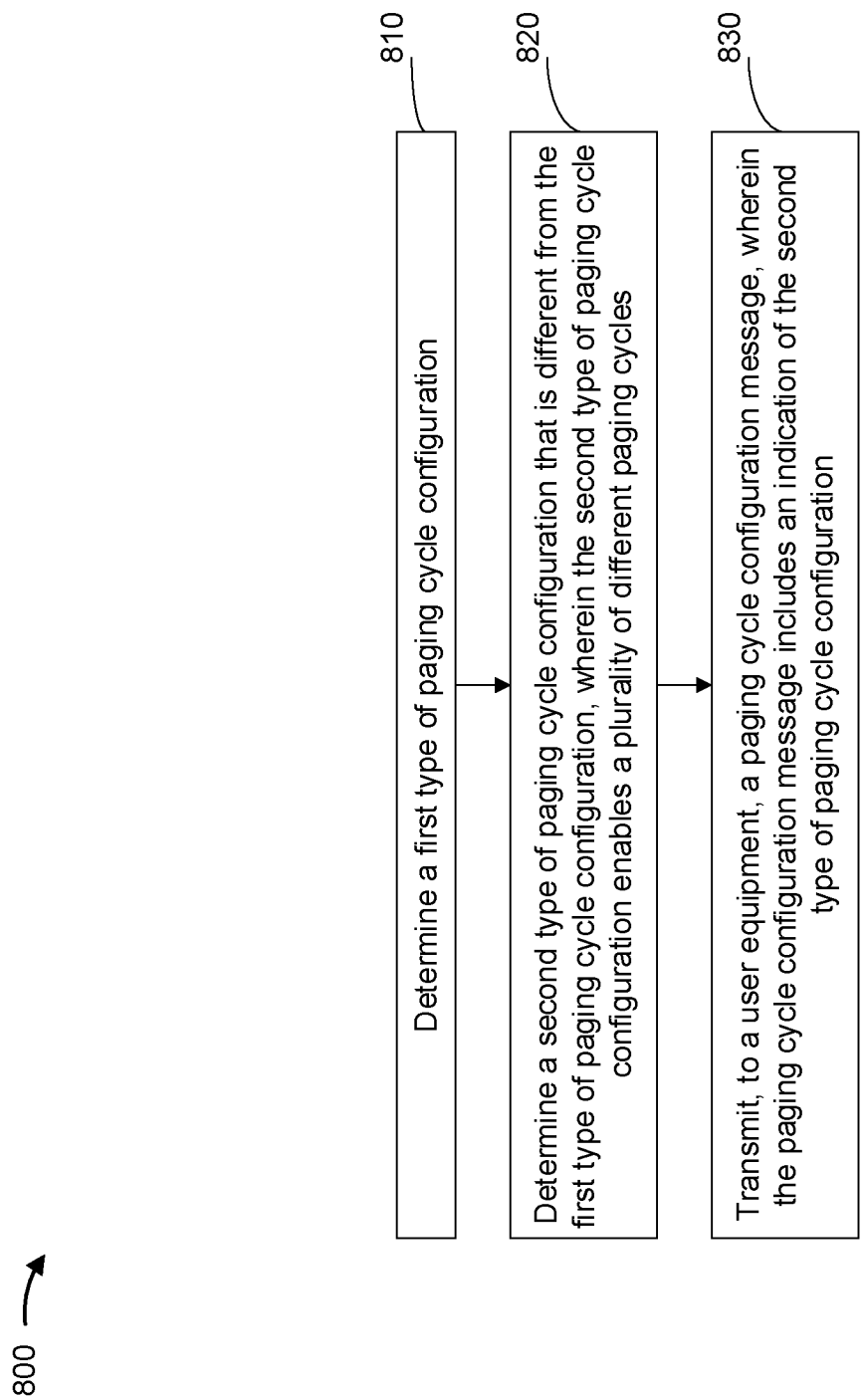

TECHNIQUES FOR CONFIGURING PAGING CYCLES

CROSS-REFERENCE TO RELATED APPLICATION

This Patent Application claims priority to U.S. Provisional Patent Application No. 62/867,528, filed on Jun. 27, 2019, entitled "TECHNIQUES FOR CONFIGURING PAGING CYCLES," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques for configuring paging cycles.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving, from a base station, a paging cycle configuration message identifying a paging cycle configuration, wherein the paging cycle configuration enables a plurality of different paging cycles; receiving, after receiving the paging cycle configuration message, first paging according to a first paging cycle of the plurality of different paging cycles; and receiving, after receiving the first paging, second paging according to a second paging cycle of the plurality of different paging cycles.

In some aspects, the paging cycle configuration message includes a set of values for the plurality of different paging cycles conveyed using a system information block message. In some aspects, the UE is configured to select from the plurality of different paging cycles based at least in part on at least one of a system time, a system frame number, a slot index, or a UE identity. In some aspects, the UE is configured to identify the plurality of different paging cycles based at least in part on randomization information received from a core network device. In some aspects, the UE is configured to receive the first paging or the second paging jointly with paging from at least one other BS.

In some aspects, the UE is configured to receive the first paging and the second paging based at least in part on at least one of the UE being configured for concurrent radio access technology usage or a paging collision occurring. In some aspects, the UE is configured to transmit signaling requesting use of the paging cycle configuration. In some aspects, the method includes receiving, after receiving paging of the paging cycle configuration, third paging using another type of paging cycle configuration with a single paging cycle.

In some aspects, a UE for wireless communication may include memory and one or more processors operatively coupled to the memory. The memory and the one or more processors may be configured to receive, from a base station, a paging cycle configuration message identifying a paging cycle configuration, wherein the paging cycle configuration enables a plurality of different paging cycles; receive, after receiving the paging cycle configuration message, first paging according to a first paging cycle of the plurality of different paging cycles; and receive, after receiving the first paging, second paging according to a second paging cycle of the plurality of different paging cycles.

In some aspects, the paging cycle configuration message includes a set of values for the plurality of different paging cycles conveyed using a system information block message. In some aspects, the UE is configured to select from the plurality of different paging cycles based at least in part on at least one of a system time, a system frame number, a slot index, or a UE identity. In some aspects, the UE is configured to identify the plurality of different paging cycles based at least in part on randomization information received from a core network device. In some aspects, the UE is configured to receive the first paging or the second paging jointly with paging from at least one other BS.

In some aspects, the UE is configured to receive the first paging and the second paging based at least in part on at least one of the UE being configured for concurrent radio access technology usage or a paging collision occurring. In some aspects, the UE is configured to transmit signaling requesting use of the paging cycle configuration. In some aspects, the one or more instructions may include instructions for receiving, after receiving paging of the paging cycle configuration, third paging using another type of paging cycle configuration with a single paging cycle.

In some aspects, a non-transitory computer-readable medium may store one or more instructions for wireless communication. The one or more instructions, when executed by one or more processors of a base station (BS), may cause the one or more processors to determine a first type of paging cycle configuration; determine a second type of paging cycle configuration that is different from the first type of paging cycle configuration, wherein the second type of paging cycle configuration enables a plurality of different paging cycles; and transmit, to a user equipment, a paging cycle configuration message, wherein the paging cycle configuration message includes an indication of the second type of paging cycle configuration.

In some aspects, the BS is configured to select from the plurality of different paging cycles based at least in part on at least one of a system time, a system frame number, a slot index, or a user equipment identity. In some aspects, the BS is configured to identify the plurality of different paging cycles based at least in part on randomization information received from a core network device. In some aspects, the BS is configured to page the user equipment jointly with paging to the user equipment from at least one other BS.

In some aspects, the BS is configured to transmit using two or more of the plurality of different paging cycles based at least in part on at least one of the user equipment being configured for concurrent radio access technology usage or a paging collision occurring. In some aspects, the BS is configured to page, using the first type of paging cycle configuration, another user equipment that is not configured for concurrent radio access technology usage or for which a paging collision is not occurring. In some aspects, the BS is configured to identify that the user equipment is configured for concurrent radio access technology usage based at least in part on at least one of received signaling from a core network device, received signaling from the user equipment, or a stored user equipment context.

In some aspects, the BS is configured to transmit using two or more of the plurality of different paging cycles based at least in part on received signaling from the user equipment requesting use of the second type of paging cycle configuration. In some aspects, the BS is configured to page, after paging using the second type of paging cycle configuration, using the first type of paging cycle configuration. In some aspects, the BS is configured to provide information identifying the plurality of different paging cycles to one or more other BSs for radio access network initiated paging for inactive mode user equipment. In some aspects, receiving an indication that a paging collision condition or a concurrent operation condition is no longer occurring; and paging using the first type of paging cycle configuration based at least in part on receiving the indication.

In some aspects, a non-transitory computer-readable medium may store one or more instructions for wireless communication. The one or more instructions, when executed by one or more processors of a UE, may cause the one or more processors to receive, from a base station, a paging cycle configuration message identifying a paging cycle configuration, wherein the paging cycle configuration enables a plurality of different paging cycles; receive, after receiving the paging cycle configuration message, first paging according to a first paging cycle of the plurality of different paging cycles; and receive, after receiving the first paging, second paging according to a second paging cycle of the plurality of different paging cycles.

In some aspects, the paging cycle configuration message includes a set of values for the plurality of different paging cycles conveyed using a system information block message. In some aspects, the UE is configured to select from the plurality of different paging cycles based at least in part on at least one of a system time, a system frame number, a slot index, or a UE identity. In some aspects, the UE is configured to identify the plurality of different paging cycles based at least in part on randomization information received from a core network device. In some aspects, the UE is configured to receive the first paging or the second paging jointly with paging from at least one other BS.

In some aspects, the UE is configured to receive the first paging and the second paging based at least in part on at least one of the UE being configured for concurrent radio access technology usage or a paging collision occurring. In some aspects, the UE is configured to transmit signaling requesting use of the paging cycle configuration. In some aspects, the one or more instructions may include instructions for receiving, after receiving paging of the paging cycle configuration, third paging using another type of paging cycle configuration with a single paging cycle.

In some aspects, an apparatus for wireless communication may include means for determining a first type of paging cycle configuration; means for determining a second type of paging cycle configuration that is different from the first type of paging cycle configuration, wherein the second type of paging cycle configuration enables a plurality of different paging cycles; and means for transmitting, to a user equipment, a paging cycle configuration message, wherein the paging cycle configuration message includes an indication of the second type of paging cycle configuration.

In some aspects, the apparatus is configured to select from the plurality of different paging cycles based at least in part on at least one of a system time, a system frame number, a slot index, or a user equipment identity. In some aspects, the apparatus is configured to identify the plurality of different paging cycles based at least in part on randomization information received from a core network device. In some aspects, the apparatus is configured to page the user equipment jointly with paging to the user equipment from at least one other apparatus.

In some aspects, the apparatus is configured to transmit using two or more of the plurality of different paging cycles based at least in part on at least one of the user equipment being configured for concurrent radio access technology usage or a paging collision occurring. In some aspects, the apparatus is configured to page, using the first type of paging cycle configuration, another user equipment that is not configured for concurrent radio access technology usage or for which a paging collision is not occurring. In some aspects, the apparatus is configured to identify that the user equipment is configured for concurrent radio access technology usage based at least in part on at least one of received signaling from a core network device, received signaling from the user equipment, or a stored user equipment context.

In some aspects, the apparatus is configured to transmit using two or more of the plurality of different paging cycles based at least in part on received signaling from the user equipment requesting use of the second type of paging cycle configuration. In some aspects, the method includes paging, after paging using the second type of paging cycle configuration, using the first type of paging cycle configuration. In some aspects, the apparatus is configured to provide information identifying the plurality of different paging cycles to one or more other apparatuses for radio access network initiated paging for inactive mode user equipment. In some aspects, receiving an indication that a paging collision condition or a concurrent operation condition is no longer occurring; and paging using the first type of paging cycle configuration based at least in part on receiving the indication.

In some aspects, an apparatus for wireless communication may include means for receiving, from a base station, a paging cycle configuration message identifying a paging cycle configuration, wherein the paging cycle configuration enables a plurality of different paging cycles; means for receiving, after receiving the paging cycle configuration message, first paging according to a first paging cycle of the plurality of different paging cycles; and means for receiving, after receiving the first paging, second paging according to a second paging cycle of the plurality of different paging cycles.

In some aspects, the paging cycle configuration message includes a set of values for the plurality of different paging cycles conveyed using a system information block message. In some aspects, the apparatus is configured to select from the plurality of different paging cycles based at least in part on at least one of a system time, a system frame number, a slot index, or an apparatus identity. In some aspects, the apparatus is configured to identify the plurality of different paging cycles based at least in part on randomization information received from a core network device. In some aspects, the apparatus is configured to receive the first paging or the second paging jointly with paging from at least one other apparatus.

In some aspects, the apparatus is configured to receive the first paging and the second paging based at least in part on at least one of the apparatus being configured for concurrent radio access technology usage or a paging collision occurring. In some aspects, the apparatus is configured to transmit signaling requesting use of the paging cycle configuration. In some aspects, the apparatus includes means for receiving, after receiving paging of the paging cycle configuration, third paging using another type of paging cycle configuration with a single paging cycle.

In some aspects, a method of wireless communication, performed by a BS, may include determining a first type of paging cycle configuration; determining a second type of paging cycle configuration that is different from the first type of paging cycle configuration, wherein the second type of paging cycle configuration enables a plurality of different paging cycles; and transmitting, to a user equipment, a paging cycle configuration message, wherein the paging cycle configuration message includes an indication of the second type of paging cycle configuration.

In some aspects, the method includes paging the user equipment in accordance with a first paging cycle of the plurality of different paging cycles, and paging the user equipment, after paging the user equipment in accordance with the first paging cycle of the plurality of different paging cycles, in accordance with a second paging cycle of the plurality of different paging cycles. In some aspects, the BS is configured to identify the plurality of different paging cycles based at least in part on at least one of a system time, a system frame number, a slot index, or a user equipment identity. In some aspects, the paging cycle configuration message includes a set of values for the plurality of different paging cycles and is conveyed using a system information block message.

In some aspects, the BS is configured to select from the plurality of different paging cycles based at least in part on at least one of a system time, a system frame number, a slot index, or a user equipment identity. In some aspects, the BS is configured to identify the plurality of different paging cycles based at least in part on randomization information received from a core network device. In some aspects, the BS is configured to page the user equipment jointly with paging to the user equipment from at least one other BS.

In some aspects, the BS is configured to transmit using two or more of the plurality of different paging cycles based at least in part on at least one of the user equipment being configured for concurrent radio access technology usage or a paging collision occurring. In some aspects, the BS is configured to page, using the first type of paging cycle configuration, another user equipment that is not configured for concurrent radio access technology usage or for which a paging collision is not occurring. In some aspects, the BS is configured to identify that the user equipment is configured for concurrent radio access technology usage based at least in part on at least one of received signaling from a core network device, received signaling from the user equipment, or a stored user equipment context.

In some aspects, the BS is configured to transmit using two or more of the plurality of different paging cycles based at least in part on received signaling from the user equipment requesting use of the second type of paging cycle configuration. In some aspects, the method includes paging, after paging using the second type of paging cycle configuration, using the first type of paging cycle configuration. In some aspects, the BS is configured to provide information identifying the plurality of different paging cycles to one or more other BSs for radio access network initiated paging for inactive mode user equipment. In some aspects, receiving an indication that a paging collision condition or a concurrent operation condition is no longer occurring; and paging using the first type of paging cycle configuration based at least in part on receiving the indication.

In some aspects, a BS for wireless communication may include memory and one or more processors operatively coupled to the memory. The memory and the one or more processors may be configured to determine a first type of paging cycle configuration; determine a second type of paging cycle configuration that is different from the first type of paging cycle configuration, wherein the second type of paging cycle configuration enables a plurality of different paging cycles; and transmit, to a user equipment, a paging cycle configuration message, wherein the paging cycle configuration message includes an indication of the second type of paging cycle configuration.

Aspects generally include a method, apparatus, system, computer program product, non-transitory computer-readable medium, user equipment, base station, wireless communication device, and/or processing system as substantially described herein with reference to and as illustrated by the accompanying drawings and/or specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example process performed, for example, by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
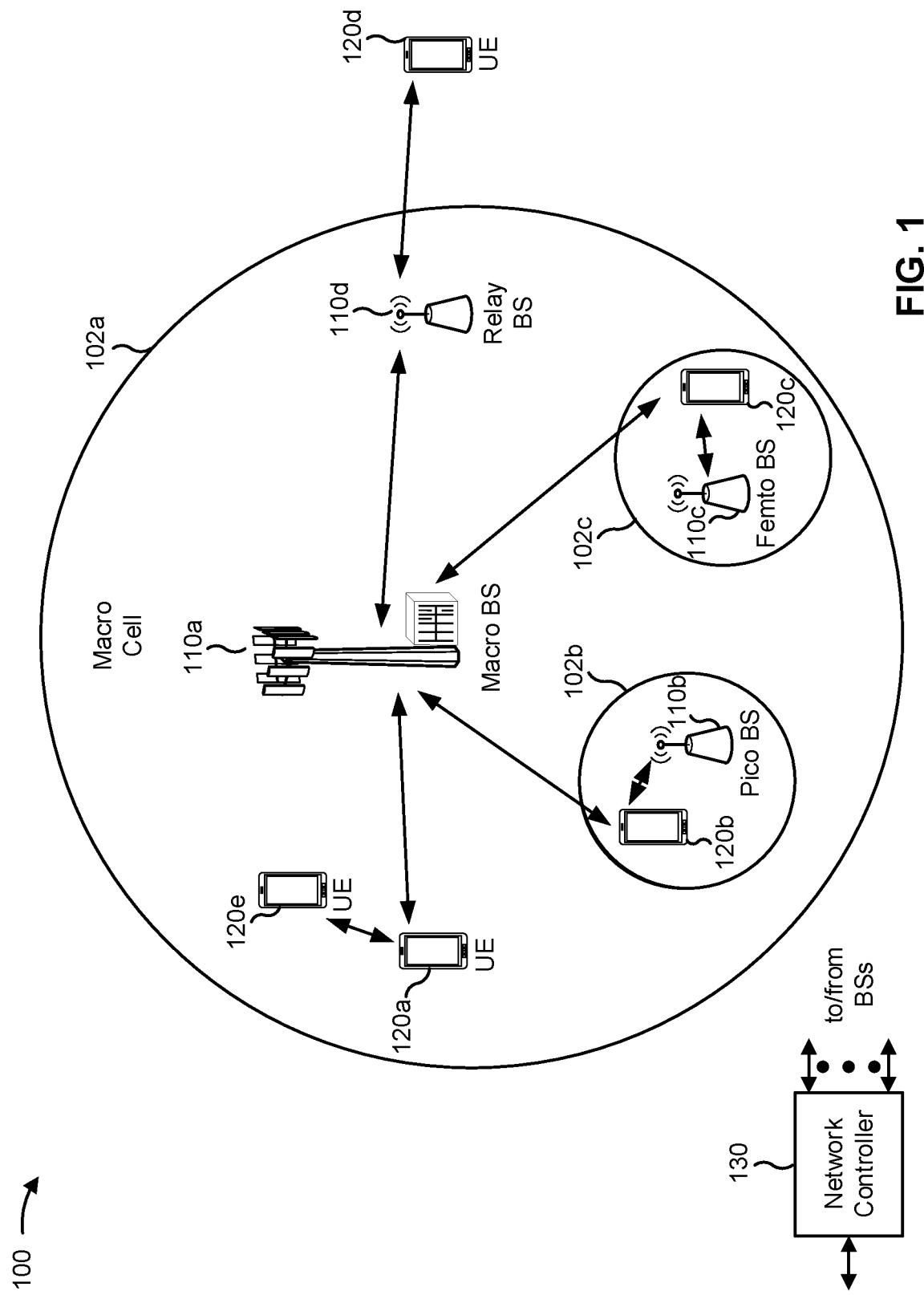
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
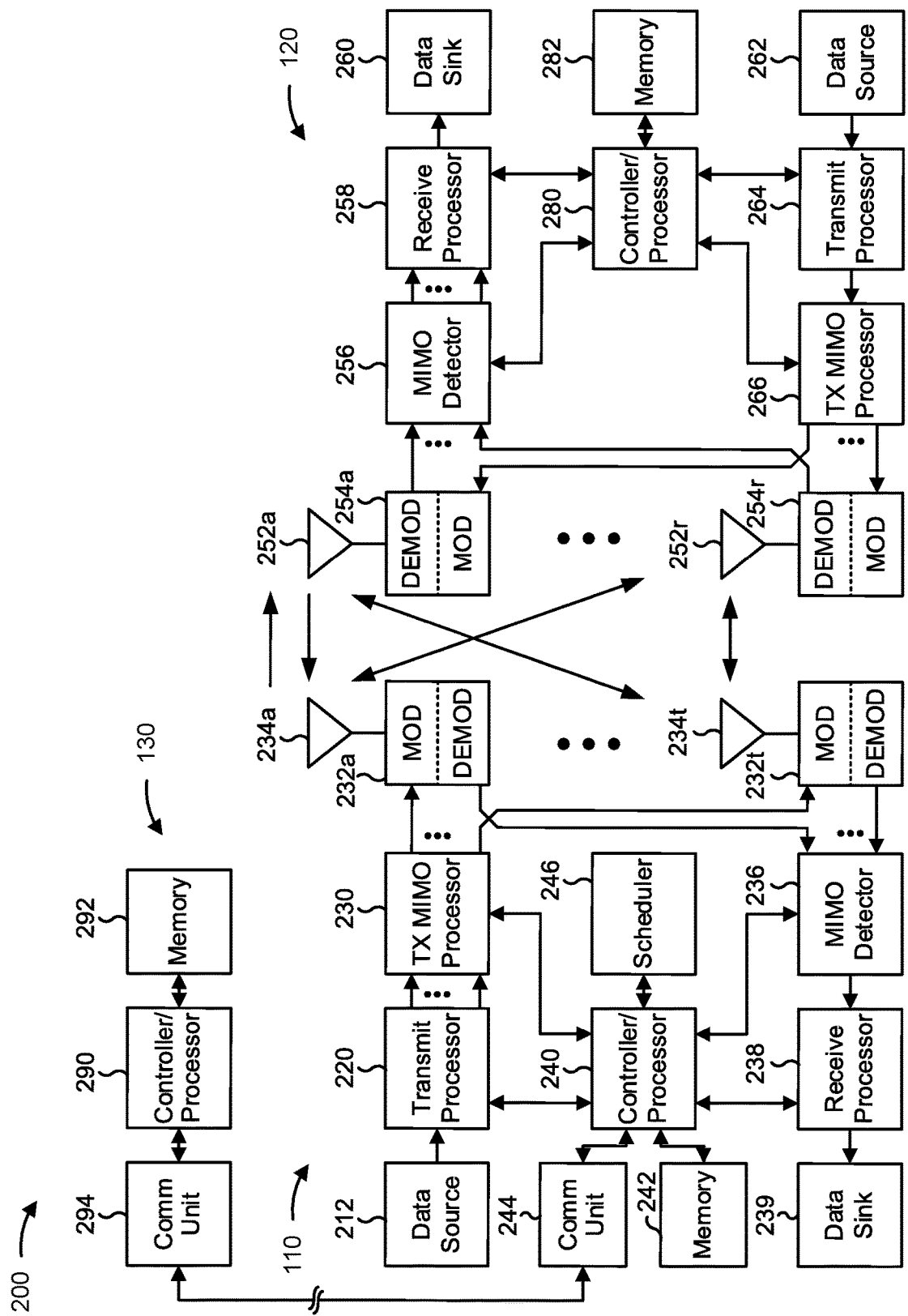
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with configuring paging cycles, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direction operations of, for example, process 800 of FIG. 8, process 900 of FIG. 9, and/or other processes as described herein. A scheduler 246 may schedule UEs for data transmission on the downlink and/or uplink.

In some aspects, UE 120 may include means for receiving, from a base station, a paging cycle configuration message identifying a paging cycle configuration, wherein the paging cycle configuration enables a plurality of different paging cycles, means for receiving, after receiving the paging cycle configuration message, first paging according to a first paging cycle of the plurality of different paging cycles, means for receiving, after receiving the first paging, second paging according to a second paging cycle of the plurality of different paging cycles, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining a first type of paging cycle configuration, means for determining a second type of paging cycle configuration that is different from the first type of paging cycle configuration, wherein the second type of paging cycle configuration enables a plurality of different paging cycles, means for transmitting, to a user equipment, a paging cycle configuration message, wherein the paging cycle configuration message includes an indication of the second type of paging cycle configuration, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3A:
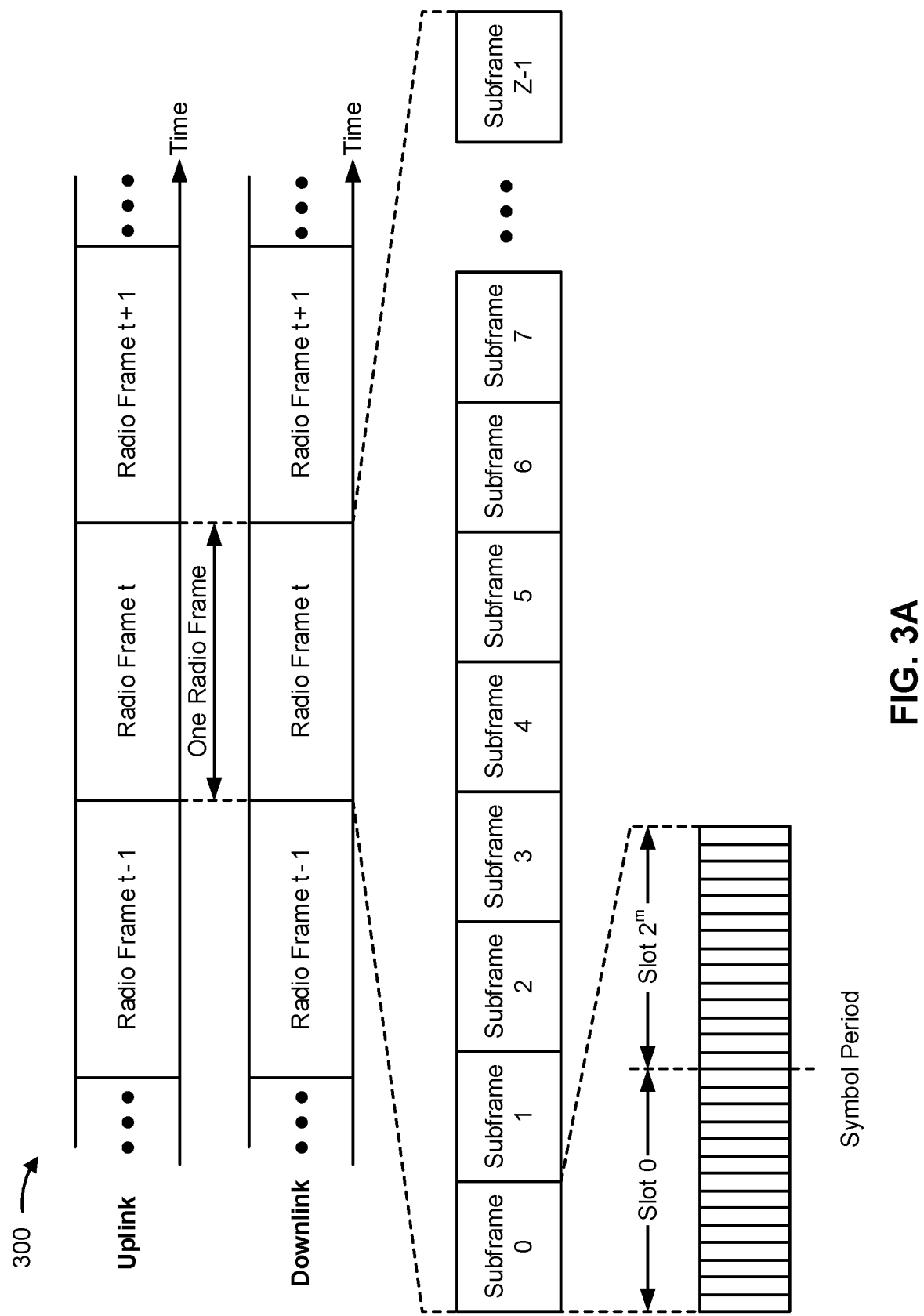
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2 L symbol periods, where the 2 L symbol periods in each subframe may be assigned indices of 0 through 2 L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
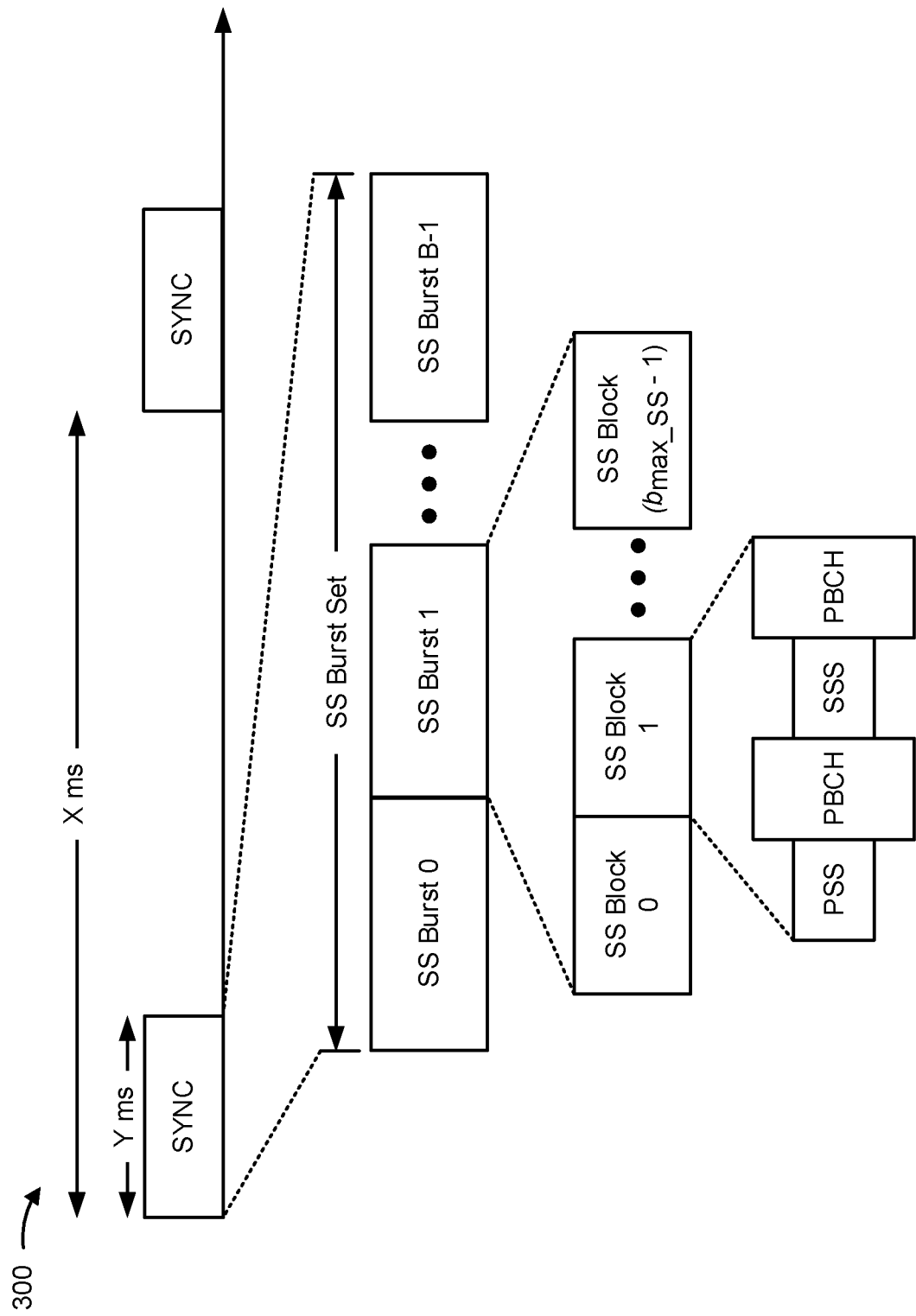
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block (bmax_SS-1), where bmax_SS-1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
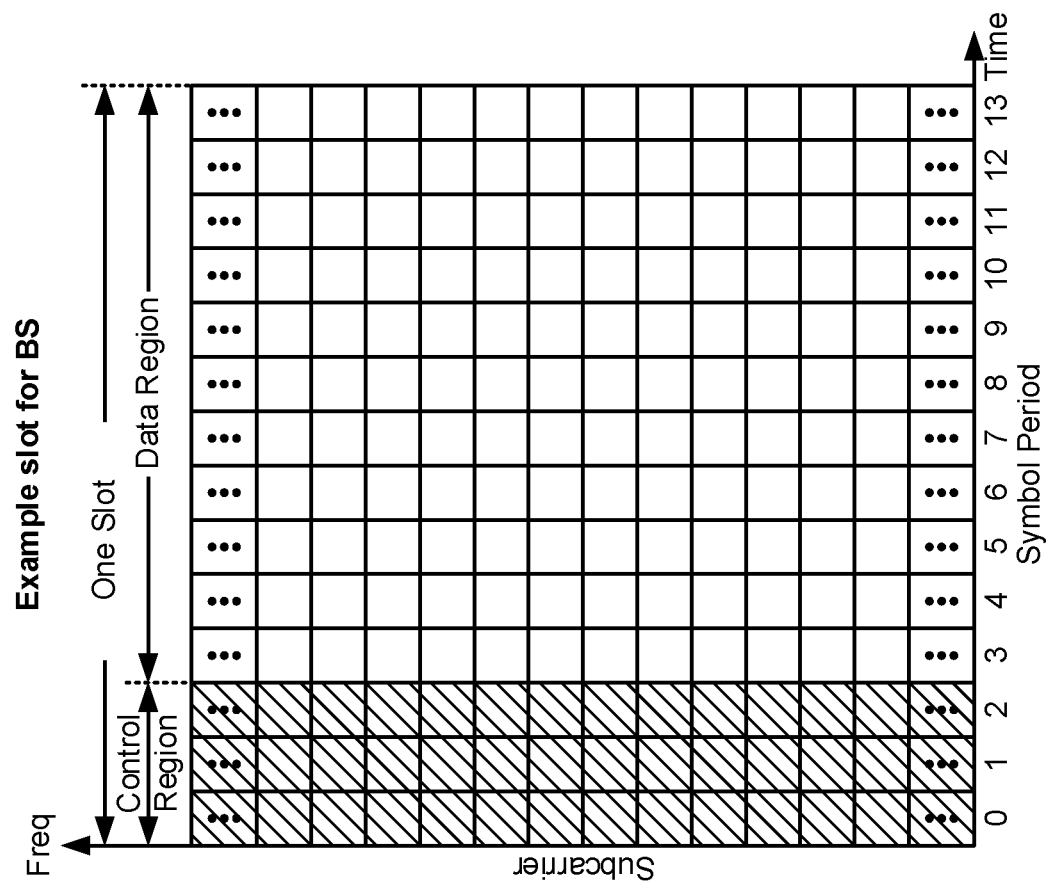
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q-1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
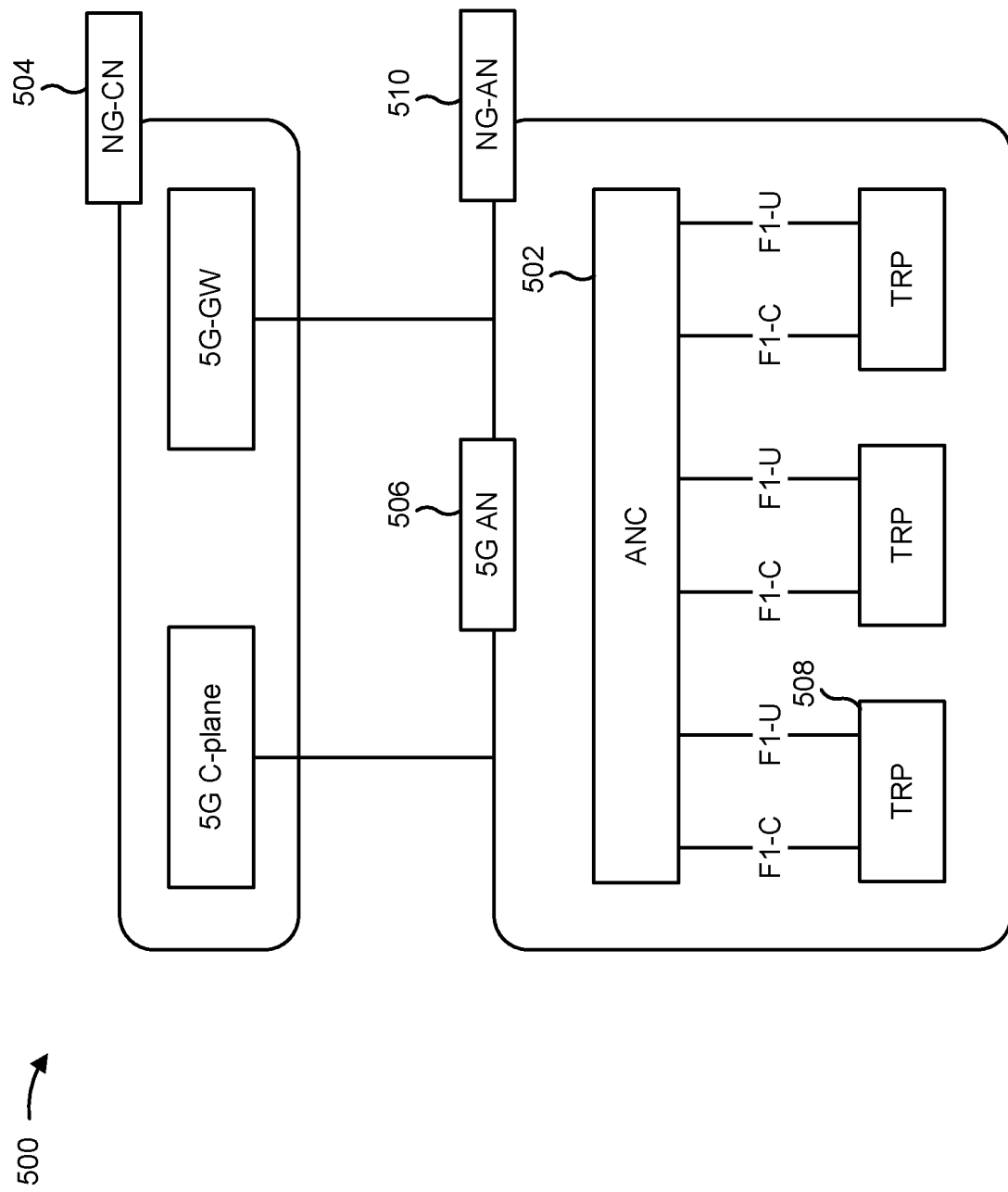
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided as an example. Other examples may differ from what is described with regard to FIG. 5.

Figure 6:
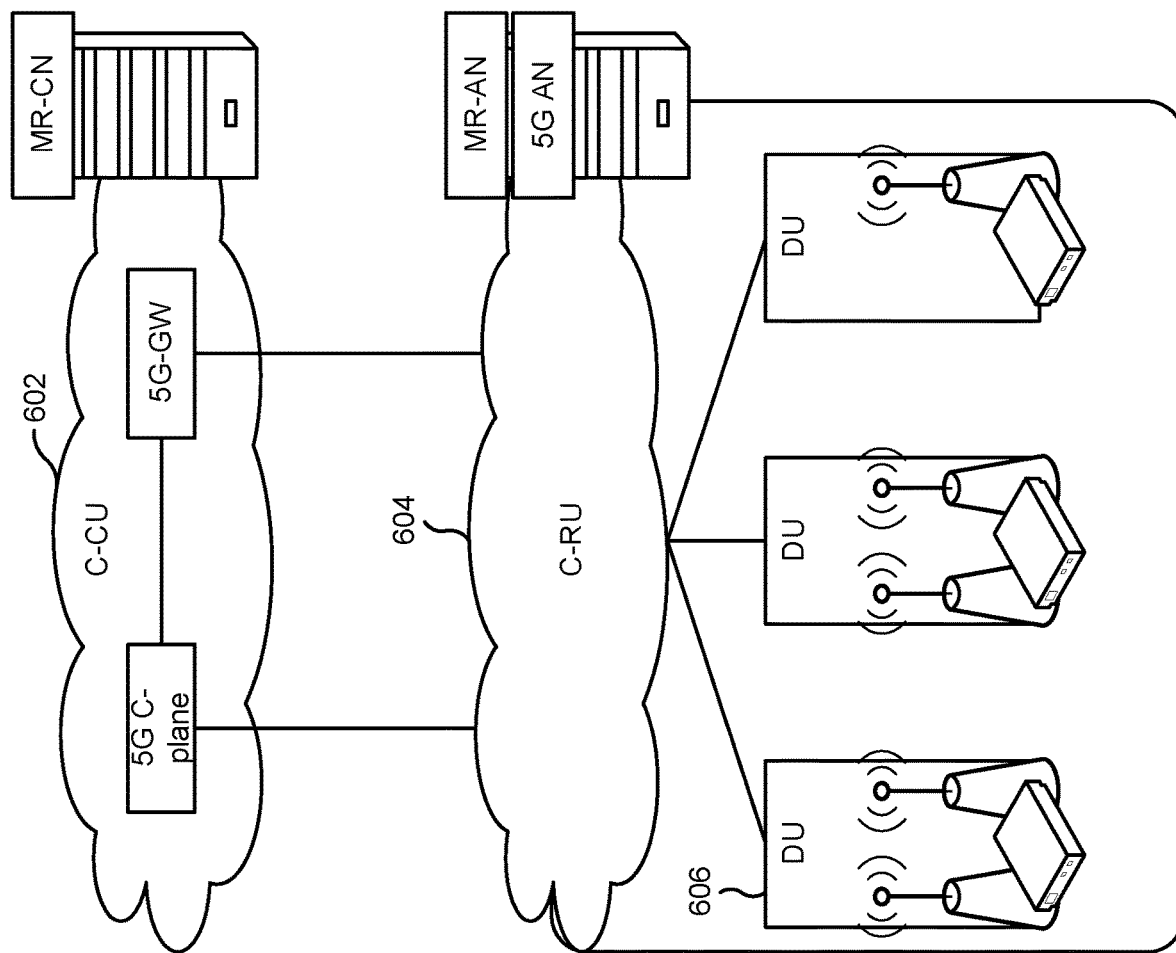
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided as an example. Other examples may differ from what is described with regard to FIG. 6.

In some communications systems, such as LTE or NR, a UE may be configured to connect to a plurality of RATs at a single time. For example, the UE may be configured to use a concurrent RAT (CRAT) service, a multi-subscriber information module (multi-SIM) service, and/or the like to connect to a plurality of LTE RATs, a plurality of NR RATs, a combination of an LTE RAT and an NR RAT, and/or the like. Although the UE may be configured to connect to a plurality of RATs using a plurality of access links at a single time, the UE may not be able to receive data and/or signaling concurrently on the plurality of access links. For example, the UE may camp on a first RAT using a first access link and may camp on a second RAT using a second access link, but may only be able to receive paging on a single access link at any one time.

In LTE, a BS and/or a UE may determine a paging frame and paging occasion based at least in part on cell level paging parameters, such as a length of a discontinuous reception (DRX) cycle, a number of paging occasions in the DRX cycle, and/or the like. When the UE camps on a plurality of LTE cells in a service area, the UE may use the same cell parameters, resulting in collisions between paging occasions of the plurality of LTE cells for the UE. Because the UE cannot receive paging on a plurality of access links concurrently, paging on at least one access link may be interrupted when the UE camps on a plurality of LTE cells.

In NR, the BS and the UE may determine a paging occasion based at least in part on a UE identity, which may be a last 10 digits of a 5G serving temporary mobile subscriber identity (5G-S-TMSI). The BS and the UE may configure a number of paging frames and a number of paging occasions in each paging frame using separate signaling procedures, and the BS may configure an offset for a paging occasion to avoid a collision between paging occasions. Thus, scheduling of paging for the UE may be flexible in NR, which may result in an inadvertent collision between paging for the UE in a first NR RAT and paging for the UE in a second NR RAT or an LTE RAT. When a paging cycle collision occurs as a result of a particular paging cycle configuration, the paging cycle collision may reoccur according to a periodicity of the paging cycle.

Some aspects described herein enable paging cycle configuration to reduce paging cycle collisions. For example, a BS may determine a paging cycle configuration that enables a plurality of different paging cycles to pseudo-randomize paging. In this case, the BS and the UE may change from a first paging cycle in the paging cycle configuration to a second paging cycle in the paging cycle configuration after a particular amount of time, thereby reducing a likelihood of paging cycle collision and periodic reoccurrence thereof. In this way, a likelihood of dropped paging is reduced, thereby improving network performance. Moreover, based at least in part on using a single paging cycle configuration message to identify the plurality of different paging cycles, the BS reduces a utilization of network resources relative to determining a new paging cycle and identifying the new paging cycle to the UE using a unique message after each paging cycle collision.

Figure 7A:
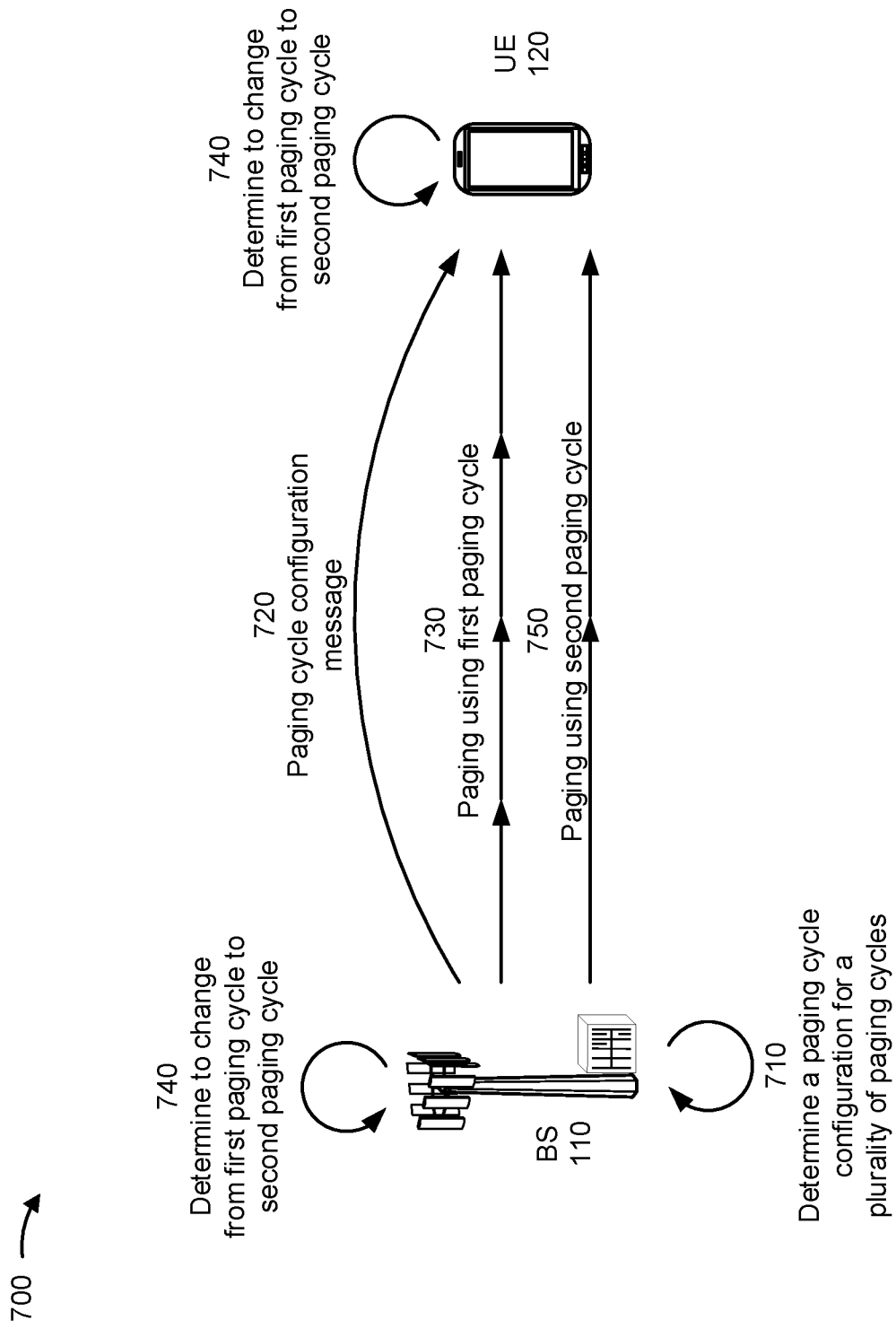
FIGS. 7A and 7B are diagrams illustrating examples of configuring paging cycles, in accordance with various aspects of the present disclosure.
Figure 7B:
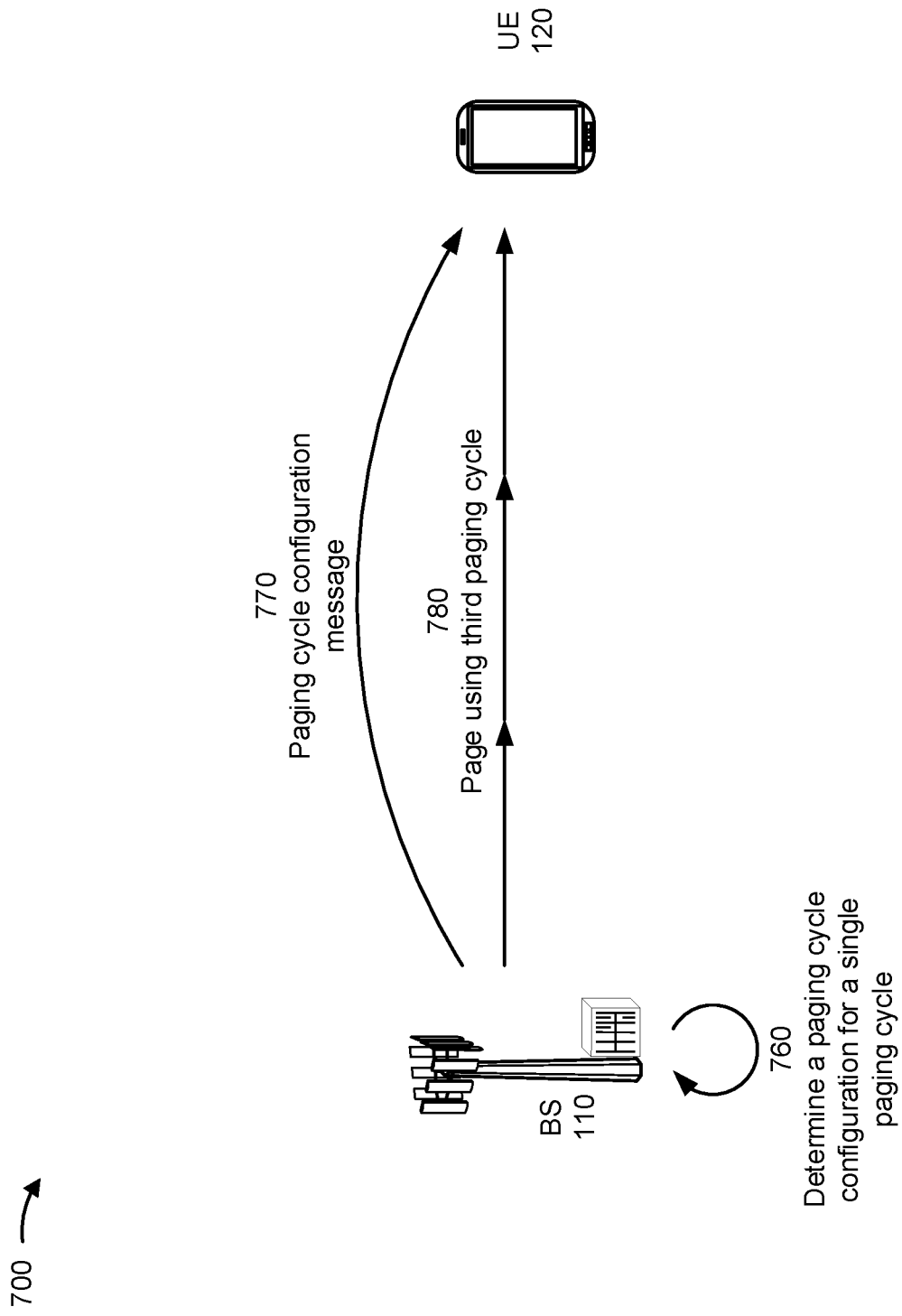

FIGS. 7A and 7B are diagrams illustrating an example 700 of techniques for configuring paging cycles, in accordance with various aspects of the present disclosure. As shown in FIG. 7A, example 700 includes a BS 110 and a UE 120.

As further shown in FIG. 7A, and by reference number 710, BS 110 may determine a paging cycle configuration for a plurality of paging cycles. For example, BS 110 may determine a paging cycle configuration for a first paging cycle, a second paging cycle, and/or the like. In this way, BS 110 may enable signaling of a plurality of paging cycles, thereby obviating a need to transmit signaling each time a paging cycle is to change to pseudo-randomized paging and avoid paging occasion collisions.

In some aspects, BS 110 may determine the plurality of paging cycles based at least in part on one or more parameters. For example, BS 110 may determine the plurality of paging cycles based at least in part on a DRX cycle, a system time (e.g., a system frame number, a slot index, and/or the like), a UE identity (e.g., a 5G-S-TMSI), and/or the like. In some aspects, BS 110 may determine a plurality of values associated with the plurality of paging cycles. For example, BS 110 may determine a first value associated with a first paging cycle, a second value associated with a second paging cycle, a third value associated with a third paging cycle, and/or the like. In this case, UE 120 may store information (e.g., a table) to relate values to paging cycles. In this way, BS 110 may signal the values (e.g., a plurality of indices) to indicate a plurality of paging cycles, thereby reducing a utilization of network resources relative to indicating a plurality of parameters for each paging cycle.

In some aspects, BS 110 may receive information identifying the plurality of paging cycles. For example, BS 110 may receive information from a network device, such as a mobility management entity (MME), an access and mobility management function (MMF), and/or the like. In this case, the information may include randomization information associated with pseudo-randomizing which paging cycle BS 110 and UE 120 are to use and/or an order of paging cycles of a plurality of paging cycles. In some aspects, the network device may provide core network initiated paging information to BS 110, which may identify a plurality of paging cycles, randomization patterns (e.g., different possible orders of paging cycles to use), and/or the like for BS 110 (and/or one or more other BSs 110). For example, BS 110 may receive paging cycle configuration information identifying paging cycles that do not interfere with paging cycles of one or more other BSs 110, to enable joint paging from BS 110 and one or more other BSs 110 to UE 120.

In some aspects, an anchor BS (e.g., which may store a UE context) may signal randomization information for determining a paging cycle configuration. For example, the anchor BS (e.g., BS 110 or another BS, which may provide information to BS 110) may determine RAN initiated paging information identifying a randomization pattern for switching between different paging cycles. In this case, BS 110 may use the randomization pattern to page UE 120 when UE 120 is in an RRC inactive mode using RAN initiated paging.

In some aspects, BS 110 may determine whether to use a paging cycle configuration with a plurality of paging cycles, or a paging cycle configuration with a single paging cycle. For example, BS 110 may determine to use a plurality of paging cycles when UE 120 is a multi-SIM or CRAT UE, a UE with paging issues, and/or the like. In this case, BS 110 may receive, from an access and mobility management function (AMF) information identifying whether UE 120 is a multi-SIM UE or CRAT UE, a UE with paging issues (e.g., paging failures have been detected), and/or the like. In some aspects, BS 110 may receive the information from the AMF during AMF initiated paging. In some aspects, when the AMF receives a UE context for UE 120, BS 110 may receive the information from the AMF when paging is initiated by BS 110. Additionally, or alternatively, BS 110 may receive a report identifying a paging collision for UE 120, and may determine to use a paging cycle configuration with a plurality of paging cycles to reduce a likelihood of a paging cycle collision.

As further shown in FIG. 7A, and by reference number 720, BS 110 may transmit a paging cycle configuration message identifying the paging cycle configuration. For example, BS 110 may transmit the paging cycle configuration message to UE 120 to identify the first paging cycle, the second paging cycle, and/or the like. In some aspects, BS 110 may transmit information identifying a plurality of values associated with a plurality of paging cycles. For example, BS 110 may transmit information identifying a first value identifying a first paging cycle, a second value identifying a second paging cycle, and/or the like. In some aspects, BS 110 may provide randomization information associated with the paging cycle configuration. For example, BS 110 may provide information indicating when to switch paging cycles (e.g., after a particular system time, after a threshold number of paging occasions, and/or the like), an order for the paging cycles, a plurality of parameters to use to select paging cycles, and/or the like.

In some aspects, BS 110 may provide information to enable UE 120 to determine the paging cycles. For example, BS 110 may provide information identifying an algorithm or formula for calculating the paging cycles, parameters for calculating a result of a stored algorithm or formula for calculating the paging cycles, and/or the like. In some aspects, BS 110 may provide the information identifying the paging cycle configuration via a particular type of message. For example, BS 110 may provide a system information block (SIB) message identifying the paging cycle configuration.

As further shown in FIG. 7A, and by reference number 730, BS 110 may page UE 120 using a first paging cycle. For example, BS 110 may transmit one or more signals to UE 120 in accordance with the first paging cycle of the paging cycle configuration. In this case, BS 110 may transmit one signal using the first paging cycle, two signals using the first paging cycle, or any other number of signals using the first paging cycle. In some aspects, BS 110 may transmit a paging message using the first paging cycle. For example, BS 110 may transmit the paging message on a paging control channel to UE 120 in order to page UE 120. Additionally, or alternatively, BS 110 may transmit a short message on a physical downlink control channel. In some aspects, BS 110 may transmit a plurality of messages using the first paging cycle. For example, BS 110 may transmit a first paging message, a second paging message, a third paging message, and/or the like using a periodicity of the first paging cycle.

Additionally, or alternatively, BS 110 may transmit a single paging message using a paging occasion identified based at least in part on the first paging cycle.

In some aspects, BS 110 and UE 120 may determine to use the first paging cycle based at least in part on the paging cycle configuration. For example, UE 120 may store configuration information indicating that a first value identified in the paging cycle configuration corresponds to the first paging cycle that is to be used for paging. Additionally, or alternatively, UE 120 may select from a plurality of paging cycles of the paging cycle configuration based at least in part on a system frame number, a UE identifier, a UE context, and/or the like.

As further shown in FIG. 7A, and by reference number 740, BS 110 and UE 120 may determine to change paging cycles of the paging cycle configuration. For example, BS 110 and UE 120 may determine to change from using the first paging cycle for paging to using the second paging cycle for paging. In some aspects, BS 110 and UE 120 may determine to change paging cycles after a particular amount of time, messages, and/or the like. For example, UE 120 may receive paging using the first paging cycle for a particular amount of time, may determine that a system time satisfies a criterion of the paging cycle configuration, and may determine to change to another paging cycle to reduce a likelihood of paging collisions.

In some aspects, BS 110 and UE 120 may change paging cycles again and use another paging cycle of the paging cycle configuration. For example, BS 110 and UE 120 may use a third paging cycle, a fourth paging cycle, and/or the like from the paging cycle configuration. Moreover, BS 110 and UE 120 may repeat using one or more paging cycles. In some aspects, there may be one or more intervening operations and/or signals between instances of using paging cycles. For example, BS 110 may transmit paging using the first paging cycle, perform one or more other operations or transmit one or more other transmissions, and then may transmit paging using the second paging cycle.

As further shown in FIG. 7A, and by reference number 750, BS 110 may page UE 120 using the second paging cycle. For example, BS 110 may transmit a plurality of signals to UE 120 in accordance with the second paging cycle of the paging cycle configuration. In some aspects, UE 120 may receive paging using the second paging cycle without receiving another message identifying another paging cycle configuration. For example, UE 120 may use the paging cycle configuration identifying the plurality of paging cycles to determine the second paging cycle, and may receive paging using the second paging cycle based on the paging cycle configuration and without receiving a new paging cycle configuration indication message.

As shown in FIG. 7B, and by reference number 760, in another case (e.g., with the same UE 120 before or after the paging using the first paging cycle and the second paging cycle, with another UE 120 before, concurrent with, or after the paging using the first paging cycle and the second paging cycle, and/or the like), BS 110 may determine a different paging cycle configuration. For example, BS 110 may determine a single paging cycle for the different paging cycle configuration. In some aspects, BS 110 may determine the single paging cycle after a report indicating that paging collisions are not occurring. For example, after a threshold period of time without a paging collision for UE 120, BS 110 may determine to switch from a first type of paging cycle configuration with a plurality of different paging cycles to a second type of paging cycle configuration with a single paging cycle (e.g., a legacy paging cycle configuration). In some aspects, BS 110 may determine the single paging cycle after UE 120 stops using a plurality of RATs or for another UE 120 that does not use a plurality of RATs.

As further shown in FIG. 7B, and by reference number 770, BS 110 may transmit a paging cycle configuration message to identify the new paging cycle configuration. For example, BS 110 may transmit the paging cycle configuration message to UE 120 to identify the single paging cycle of the new paging cycle configuration.

As further shown in FIG. 7B, and by reference number 780, BS 110 may page UE 120 using a third paging cycle (e.g., the single paging cycle of the new paging cycle configuration). For example, BS 110 may transmit a plurality of signals in accordance with the third paging cycle. In this case, when BS 110 is to change to another paging cycle, BS 110 may transmit another message identifying another paging cycle configuration to change to another paging cycle.

As indicated above, FIGS. 7A and 7B are provided as an example. Other examples may differ from what is described with respect to FIGS. 7A and 7B.

FIG. 8 is a diagram illustrating an example process 800 performed, for example, by a BS, in accordance with various aspects of the present disclosure. Example process 800 is an example where a BS (e.g., BS 110 and/or the like) performs operations associated with techniques for configuring paging cycles.

As shown in FIG. 8, in some aspects, process 800 may include determining a first type of paging cycle configuration (block 810). For example, the BS (e.g., using transmit processor 220, receive processor 238, controller/processor 240, memory 242, and/or the like) may determine a first type of paging cycle configuration, as described above.

As further shown in FIG. 8, in some aspects, process 800 may include determining a second type of paging cycle configuration that is different from the first type of paging cycle configuration, wherein the second type of paging cycle configuration enables a plurality of different paging cycles (block 820). For example, the BS (e.g., using transmit processor 220, receive processor 238, controller/processor 240, memory 242, and/or the like) may determine a second type of paging cycle configuration that is different from the first type of paging cycle configuration, as described above. In some aspects, the second type of paging cycle configuration enables a plurality of different paging cycles.

As further shown in FIG. 8, in some aspects, process 800 may include transmitting, to a user equipment, a paging cycle configuration message, wherein the paging cycle configuration message includes an indication of the second type of paging cycle configuration (block 830). For example, the BS (e.g., using transmit processor 220, receive processor 238, controller/processor 240, memory 242, and/or the like) may transmit, to a user equipment, a paging cycle configuration message, as described above. In some aspects, the paging cycle configuration message includes an indication of the second type of paging cycle configuration.

Process 800 may include additional aspects, such as any single aspect or any combination of aspects described below and/or in connection with one or more other processes described elsewhere herein.

In a first aspect, process 800 includes paging the user equipment in accordance with a first paging cycle of the plurality of different paging cycles, and paging the user equipment, after paging the user equipment in accordance with the first paging cycle of the plurality of different paging cycles, in accordance with a second paging cycle of the plurality of different paging cycles.

In a second aspect, alone or in combination with the first aspect, the BS is configured to identify the plurality of different paging cycles based at least in part on at least one of a system time, a system frame number, a slot index, or a user equipment identity.

In a third aspect, alone or in combination with one or more of the first and second aspects, the paging cycle configuration message includes a set of values for the plurality of different paging cycles and is conveyed using a system information block message.

In a fourth aspect, alone or in combination with one or more of the first through third aspects, the BS is configured to select from the plurality of different paging cycles based at least in part on at least one of a system time, a system frame number, a slot index, or a user equipment identity.

In a fifth aspect, alone or in combination with one or more of the first through fourth aspects, the BS is configured to identify the plurality of different paging cycles based at least in part on randomization information received from a core network device.

In a sixth aspect, alone or in combination with one or more of the first through fifth aspects, the BS is configured to page the user equipment jointly with paging to the user equipment from at least one other BS.

In a seventh aspect, alone or in combination with one or more of the first through sixth aspects, the BS is configured to transmit using two or more of the plurality of different paging cycles based at least in part on at least one of the user equipment being configured for concurrent radio access technology usage or a paging collision occurring.

In an eighth aspect, alone or in combination with one or more of the first through seventh aspects, the BS is configured to page, using the first type of paging cycle configuration, another user equipment that is not configured for concurrent radio access technology usage or for which a paging collision is not occurring.

In a ninth aspect, alone or in combination with one or more of the first through eighth aspects, the BS is configured to identify that the user equipment is configured for concurrent radio access technology usage based at least in part on at least one of received signaling from a core network device, received signaling from the user equipment, or a stored user equipment context.

In a tenth aspect, alone or in combination with one or more of the first through ninth aspects, the BS is configured to transmit using two or more of the plurality of different paging cycles based at least in part on received signaling from the user equipment requesting use of the second type of paging cycle configuration.

In an eleventh aspect, alone or in combination with one or more of the first through tenth aspects, process 800 includes paging, after paging using the second type of paging cycle configuration, using the first type of paging cycle configuration.

In a twelfth aspect, alone or in combination with one or more of the first through eleventh aspects, the BS is configured to provide information identifying the plurality of different paging cycles to one or more other BSs for radio access network initiated paging for inactive mode user equipment.

In a thirteenth aspect, alone or in combination with one or more of the first through twelfth aspects, process 800 includes receiving an indication that a paging collision condition or a concurrent operation condition is no longer occurring; and paging using the first type of paging cycle configuration based at least in part on receiving the indication.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
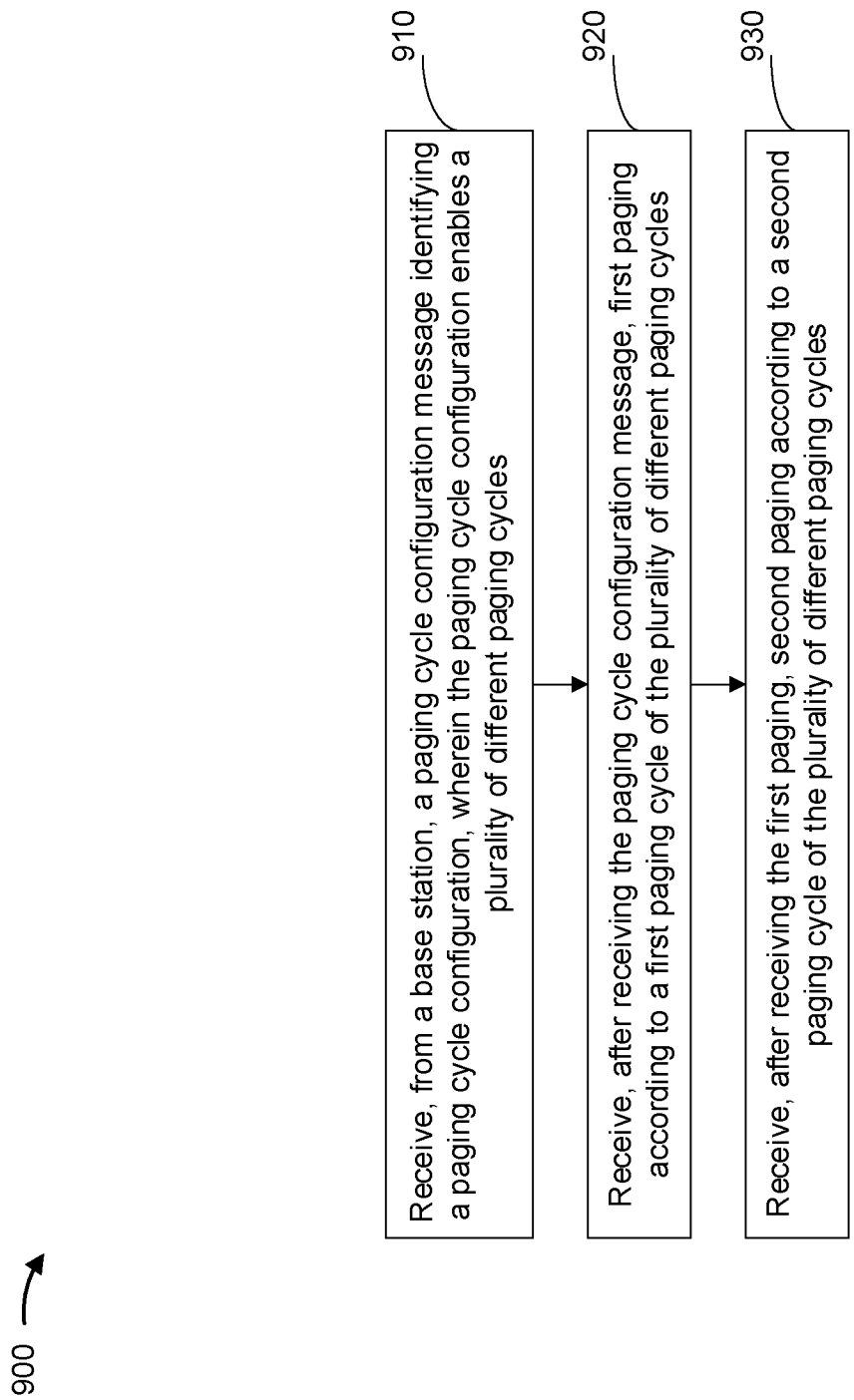
FIG. 9 is a diagram illustrating an example process performed, for example, by a user equipment, in accordance with various aspects of the present disclosure.

FIG. 9 is a diagram illustrating an example process 900 performed, for example, by a UE, in accordance with various aspects of the present disclosure. Example process 900 is an example where a UE (e.g., UE 120 and/or the like) performs operations associated with techniques for configuring paging cycles.

As shown in FIG. 9, in some aspects, process 900 may include receiving, from a base station, a paging cycle configuration message identifying a paging cycle configuration, wherein the paging cycle configuration enables a plurality of different paging cycles (block 910). For example, the UE (e.g., using receive processor 258, transmit processor 264, controller/processor 280, memory 282, and/or the like) may receive, from a base station, a paging cycle configuration message identifying a paging cycle configuration, as described above. In some aspects, the paging cycle configuration enables a plurality of different paging cycles.

As further shown in FIG. 9, in some aspects, process 900 may include receiving, after receiving the paging cycle configuration message, first paging according to a first paging cycle of the plurality of different paging cycles (block 920). For example, the UE (e.g., using receive processor 258, transmit processor 264, controller/processor 280, memory 282, and/or the like) may receive, after receiving the paging cycle configuration message, first paging according to a first paging cycle of the plurality of different paging cycles, as described above.

As further shown in FIG. 9, in some aspects, process 900 may include receiving, after receiving the first paging, second paging according to a second paging cycle of the plurality of different paging cycles (block 930). For example, the UE (e.g., using receive processor 258, transmit processor 264, controller/processor 280, memory 282, and/or the like) may receive, after receiving the first paging, second paging according to a second paging cycle of the plurality of different paging cycles, as described above.

Process 900 may include additional aspects, such as any single aspect or any combination of aspects described below and/or in connection with one or more other processes described elsewhere herein.

In a first aspect, the paging cycle configuration message includes a set of values for the plurality of different paging cycles conveyed using a system information block message.

In a second aspect, alone or in combination with the first aspect, the UE is configured to select from the plurality of different paging cycles based at least in part on at least one of a system time, a system frame number, a slot index, or a UE identity.

In a third aspect, alone or in combination with one or more of the first and second aspects, the UE is configured to identify the plurality of different paging cycles based at least in part on randomization information received from a core network device.

In a fourth aspect, alone or in combination with one or more of the first through third aspects, the UE is configured to receive the first paging or the second paging jointly with paging from at least one other BS.

In a fifth aspect, alone or in combination with one or more of the first through fourth aspects, the UE is configured to receive the first paging and the second paging based at least in part on at least one of the UE being configured for concurrent radio access technology usage or a paging collision occurring.

In a sixth aspect, alone or in combination with one or more of the first through fifth aspects, the UE is configured to transmit signaling requesting use of the paging cycle configuration.

In a seventh aspect, alone or in combination with one or more of the first through sixth aspects, process 900 includes receiving, after receiving paging of the paging cycle configuration, third paging using another type of paging cycle configuration with a single paging cycle.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
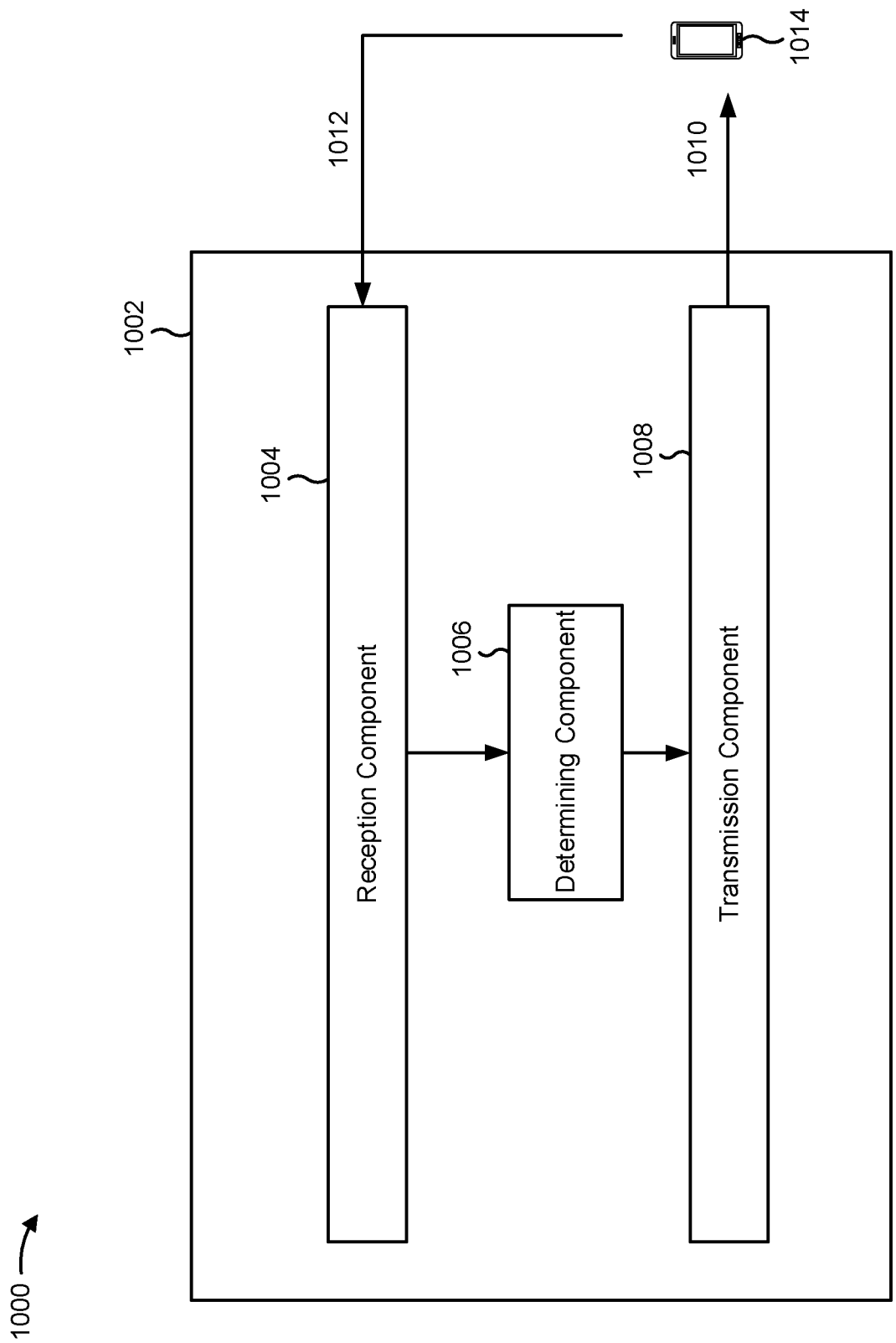
FIGS. 10 and 11 are conceptual data flow diagrams illustrating data flows between different modules/means/components in example apparatuses, in accordance with various aspects of the present disclosure.

FIG. 10 is a conceptual data flow diagram 1000 illustrating the data flow between different modules/means/components in an example apparatus 1002. The apparatus 1002 may be a base station (e.g., BS 110). In some aspects, apparatus 1002 includes a reception component 1004, a determining component 1006, and a transmission component 1008.

Determining component 1006 may determine a paging cycle configuration for a plurality of paging cycles for paging a UE 1014 (e.g., UE 120). In some aspects, determining component 1006 may include a processor (e.g., a transmit processor 220, a receive processor 238, a controller/processor 240, and/or the like).

Transmission component 1008 may transmit a communication 1010 to UE 1014. Communication 1010 may include an indication of the paging cycle configuration to UE 1014. In some aspects, communication 1010 may be a paging message or a short message transmitted using a first paging cycle, a second paging cycle, and/or the like of a paging cycle configuration. In some aspects, transmission component 1008 may include an antenna (e.g., antenna 234), a transmit processor (e.g., transmit processor 220), a controller/processor (e.g., controller/processor 240), a transceiver, a transmitter, and/or the like.

Reception component 1004 may receive a report 1012 from UE 1014. For example, reception component 1004 may receive a report identifying a paging cycle collision, a capability of UE 1014, and/or the like that may trigger the determining component 1006 to determine a paging cycle configuration. In some aspects, reception component 1004 may include an antenna (e.g., antenna 234), a receive processor (e.g., receive processor 238), a controller/processor (e.g., controller/processor 240), a transceiver, a receiver, and/or the like.

Apparatus 1002 may include additional components that perform each of the blocks of the algorithm in the aforementioned process 800 of FIG. 8 and/or the like. Each block in the aforementioned process 800 of FIG. 8 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of components (e.g., one or more components) shown in FIG. 10 may perform one or more functions described as being performed by another set of components shown in FIG. 10.

Figure 11:
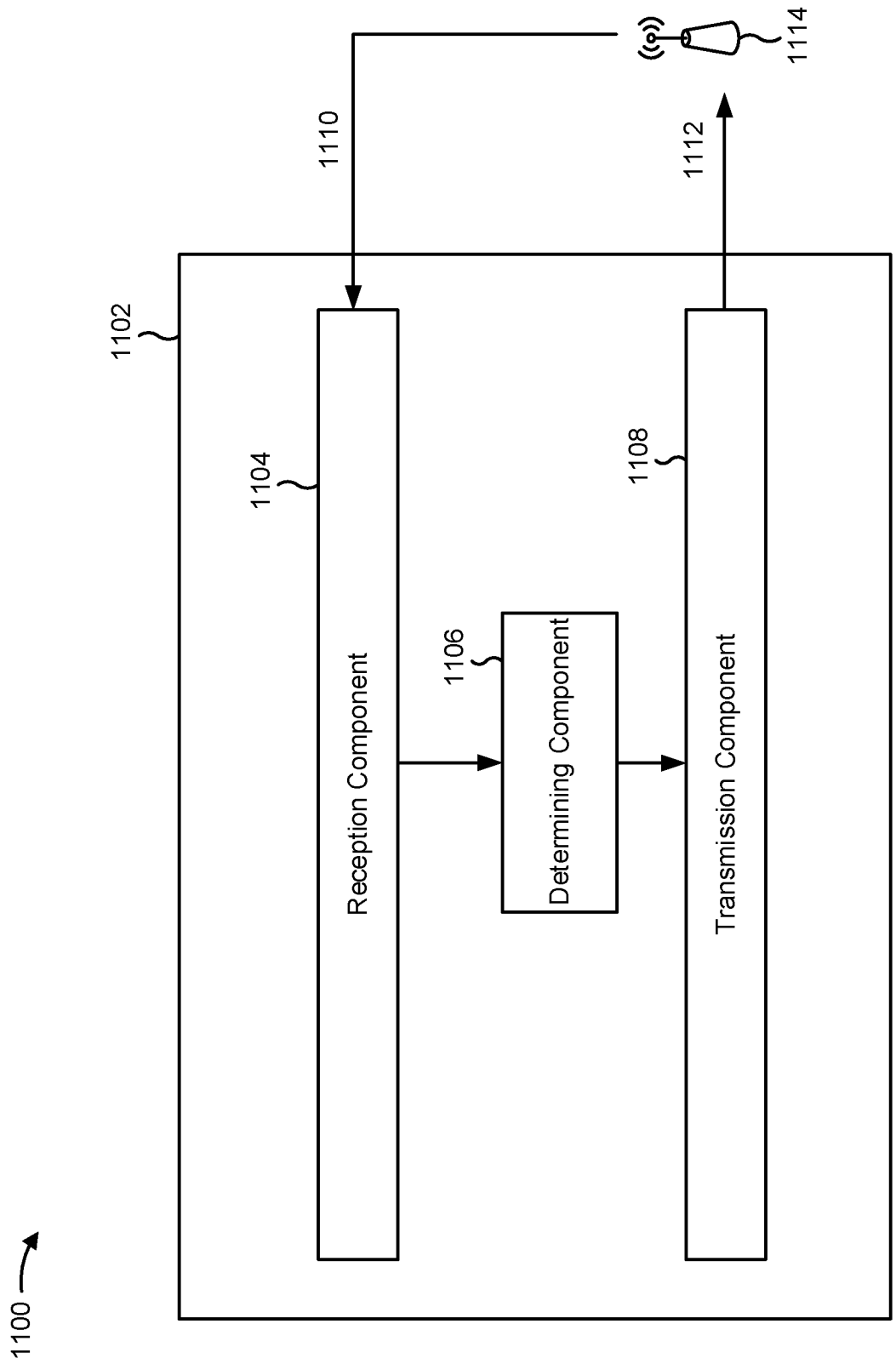

FIG. 11 is a conceptual data flow diagram 1100 illustrating the data flow between different modules/means/components in an example apparatus 1102. The apparatus 1102 may be a UE (e.g., UE 120). In some aspects, the apparatus 1102 includes a reception component 1104, a determining component 1106, and a transmission component 1108.

Reception component 1104 may receive a communication 1110 from a BS 1114 (e.g., BS 110). For example, reception component 1104 may receive communication 1110 that includes an indication of a paging cycle configuration. Additionally, or alternatively, reception component 1104 may receive paging from BS 1114. In some aspects, reception component 1104 may include an antenna (e.g., antenna 252), a receive processor (e.g., receive processor 258), a controller/processor (e.g., controller/processor 280), a transceiver, a receiver, and/or the like.

Determining component 1106 may determine a paging cycle configuration. For example, determining component 1106 may determine when to receive first paging using a first paging cycle, second paging using a second paging cycle, and/or the like. In some aspects, determining component 1106 may include a processor (e.g., controller/processor 280, receive processor 258, and/or the like).

Transmission component 1108 may transmit a report 1112 to BS 1114. For example, transmission component 1108 may transmit a report of a paging cycle collision, a UE capability, and/or the like. In some aspects, transmission component 1108 may include an antenna (e.g., antenna 252), a transmit processor (e.g., transmit processor 264), a controller/processor (e.g., controller/processor 280), a transceiver, a transmitter, and/or the like.

Apparatus 1102 may include additional components that perform each of the blocks of the algorithm in the aforementioned process 900 of FIG. 9 and/or the like. Each block in the aforementioned process 900 of FIG. 9 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of components (e.g., one or more components) shown in FIG. 11 may perform one or more functions described as being performed by another set of components shown in FIG. 11.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a base station (BS), comprising:
    determining a first type of paging cycle configuration;
    determining a second type of paging cycle configuration that is different from the first type of paging cycle configuration,
        wherein the second type of paging cycle configuration enables a plurality of different paging cycles and the first type of paging cycle configuration enables a single paging cycle; and
    transmitting, to a user equipment, a paging cycle configuration message and randomization information associated with the second type of paging cycle configuration,
        wherein the paging cycle configuration message includes an indication of the second type of paging cycle configuration, and
        wherein the paging cycle configuration message includes an indication of the plurality of different paging cycles.

2. The method of claim 1, further comprising:
    paging the user equipment in accordance with a first paging cycle of the plurality of different paging cycles; and
    paging the user equipment, after paging the user equipment in accordance with the first paging cycle of the plurality of different paging cycles, in accordance with a second paging cycle of the plurality of different paging cycles.

3. The method of claim 1, wherein the BS is configured to identify the plurality of different paging cycles based at least in part on at least one of:
    a system time,
    a system frame number,
    a slot index, or
    a user equipment identity.

4. The method of claim 1, wherein the paging cycle configuration message includes a set of values for the plurality of different paging cycles and is conveyed using a system information block message.

5. The method of claim 1, wherein the BS is configured to select from the plurality of different paging cycles based at least in part on at least one of:
    a system time,
    a system frame number,
    a slot index, or
    a user equipment identity.

6. The method of claim 1, wherein the BS is configured to identify the plurality of different paging cycles based at least in part on the randomization information, and
    wherein the randomization information is received from a core network device.

7. The method of claim 1, wherein the BS is configured to page the user equipment jointly with paging to the user equipment from at least one other BS.

8. The method of claim 1, wherein the BS is configured to transmit using two or more of the plurality of different paging cycles based at least in part on at least one of the user equipment being configured for concurrent radio access technology usage or a paging collision occurring.

9. The method of claim 8, wherein the BS is configured to page, using the first type of paging cycle configuration, another user equipment that is not configured for concurrent radio access technology usage or for which a paging collision is not occurring.

10. The method of claim 8, wherein the BS is configured to identify that the user equipment is configured for concurrent radio access technology usage based at least in part on at least one of received signaling from a core network device, received signaling from the user equipment, or a stored user equipment context.

11. The method of claim 1, wherein the BS is configured to transmit using two or more of the plurality of different paging cycles based at least in part on received signaling from the user equipment requesting use of the second type of paging cycle configuration.

12. The method of claim 1, further comprising:
paging, after paging using the second type of paging cycle configuration, using the first type of paging cycle configuration.

13. The method of claim 1, further comprising:
receiving an indication that a paging collision condition or a concurrent operation condition is no longer occurring; and
wherein the paging using the first type of paging cycle configuration comprises:
paging using the first type of paging cycle configuration based at least in part on receiving the indication.

14. The method of claim 1, wherein the BS is configured to provide information identifying the plurality of different paging cycles to one or more other BSs for radio access network initiated paging for inactive mode user equipment.

15. A method of wireless communication performed by a user equipment (UE), comprising:
receiving, from a base station, a paging cycle configuration message, identifying a paging cycle configuration, and randomization information associated with the paging cycle configuration,
wherein the paging cycle configuration enables a plurality of different paging cycles, and
wherein the paging cycle configuration message includes an indication of the plurality of different paging cycles;
receiving, after receiving the paging cycle configuration message and the randomization information, first paging according to a first paging cycle of the plurality of different paging cycles; and
receiving, after receiving the first paging, second paging according to a second paging cycle of the plurality of different paging cycles.

16. The method of claim 15, wherein the paging cycle configuration message includes a set of values for the plurality of different paging cycles conveyed using a system information block message.

17. The method of claim 15, wherein the UE is configured to select from the plurality of different paging cycles based at least in part on at least one of:
a system time,
a system frame number,
a slot index, or
a UE identity.

18. The method of claim 15, wherein the UE is configured to identify the plurality of different paging cycles based at least in part on the randomization information, and
wherein the randomization information is from a core network device.

19. The method of claim 15, wherein the UE is configured to receive the first paging or the second paging jointly with paging from at least one other base station.

20. The method of claim 15, wherein the UE is configured to receive the first paging and the second paging based at least in part on at least one of the UE being configured for concurrent radio access technology usage or a paging collision occurring.

21. The method of claim 15, wherein the UE is configured to transmit signaling requesting use of the paging cycle configuration.

22. The method of claim 15, further comprising:
receiving, after receiving paging of the paging cycle configuration, third paging using another type of paging cycle configuration with a single paging cycle.

23. A base station (BS) for wireless communication, comprising:
a memory; and
one or more processors coupled to the memory, the memory and the one or more processors configured to:
determine a first type of paging cycle configuration;
determine a second type of paging cycle configuration that is different from the first type of paging cycle configuration,
wherein the second type of paging cycle configuration enables a plurality of different paging cycles and the first type of paging cycle configuration enables a single paging cycle; and
transmit, to a user equipment, a paging cycle configuration message and randomization information associated with the second type of paging cycle configuration,
wherein the paging cycle configuration message includes an indication of the second type of paging cycle configuration, and
wherein the paging cycle configuration message includes an indication of the plurality of different paging cycles.

24. The BS of claim 23, wherein the one or more processors are further configured to:
page the user equipment in accordance with a first paging cycle of the plurality of different paging cycles; and
page the user equipment, after paging the user equipment in accordance with the first paging cycle of the plurality of different paging cycles, in accordance with a second paging cycle of the plurality of different paging cycles.

25. The BS of claim 23, wherein the BS is configured to identify the plurality of different paging cycles based at least in part on at least one of:
a system time,
a system frame number,
a slot index, or
a user equipment identity.

26. The BS of claim 23, wherein the paging cycle configuration message includes a set of values for the plurality of different paging cycles and is conveyed using a system information block message.

27. A user equipment (UE) for wireless communication, comprising:
a memory; and
one or more processors coupled to the memory, the memory and the one or more processors configured to:
receive, from a base station, a paging cycle configuration message, identifying a paging cycle configuration, and randomization information associated with the paging cycle configuration,
wherein the paging cycle configuration enables a plurality of different paging cycles, and
wherein the paging cycle configuration message includes an indication of the plurality of different paging cycles;
receive, after receiving the paging cycle configuration message and the randomization information, first paging according to a first paging cycle of the plurality of different paging cycles; and
receive, after receiving the first paging, second paging according to a second paging cycle of the plurality of different paging cycles.

28. The UE of claim 27, wherein the paging cycle configuration message includes a set of values for the plurality of different paging cycles conveyed using a system information block message.

29. The UE of claim 27, wherein the UE is configured to select from the plurality of different paging cycles based at least in part on at least one of:
- a system time,
- a system frame number,
- a slot index, or
- a UE identity.

30. The UE of claim 27, wherein the UE is configured to identify the plurality of different paging cycles based at least in part on the randomization information, and
wherein the randomization information is from a core network device.

* * * * *